United States Patent
Zhan et al.

(10) Patent No.: US 11,256,519 B2
(45) Date of Patent: Feb. 22, 2022

(54) USING A SINGLE PROCESS TO INSTALL A UEFI-SUPPORTED OS OR A NON-UEFI SUPPORTED OS ON A HARDWARE PLATFORM

(71) Applicant: Dell Products L. P., Round Rock, TX (US)

(72) Inventors: Daiqian Zhan, Austin, TX (US); Xiao Ping Fang, Zhejiang (CN); Rudolf V. Bendixen, Pflugerville, TX (US); Hatim Yousef Amro, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 16/563,304

(22) Filed: Sep. 6, 2019

(65) Prior Publication Data
US 2021/0055937 A1     Feb. 25, 2021

Related U.S. Application Data

(60) Provisional application No. 62/889,760, filed on Aug. 21, 2019.

(51) Int. Cl.
*G06F 9/4401*     (2018.01)
*G06F 11/22*     (2006.01)
*G06F 8/61*     (2018.01)

(52) U.S. Cl.
CPC .............. *G06F 9/4408* (2013.01); *G06F 8/63* (2013.01); *G06F 9/441* (2013.01); *G06F 11/2284* (2013.01)

(58) Field of Classification Search
CPC ...... G06F 9/4406; G06F 9/4408; G06F 9/441; G06F 11/2284; G06F 8/60; G06F 8/61; G06F 8/63

(Continued)

(56) References Cited

U.S. PATENT DOCUMENTS 5,974,567 A * 10/1999 Dickson, Jr. ........ G06F 11/2284
                                                                            713/1
6,418,541 B1 * 7/2002 Jeon ...................... G06F 9/4406
                                                                            714/36

(Continued)

OTHER PUBLICATIONS

Hoffman, C., How Intel and PC makers prevent you from modifying your laptop's firmware, PCWorld, Feb. 13, 2015, 4 pages, [ retrieved on Apr. 22, 2021], Retrieved from the Internet: <URL:https://www.pcworld.com/article/2883903/how-intel-and-pc-makers-prevent-you-from-modifying-your-pcs-firmware.html>.*

(Continued)

*Primary Examiner* — Geoffrey R St Leger
(74) *Attorney, Agent, or Firm* — Larson Newman, LLP

(57) ABSTRACT

As an example, a computing device having a Unified Extensible Firmware Interface (UEFI) may boot into a preinstallation environment (associated with a first operating system), determine that a second operating system is to be installed on the computing device, and write an image of the second operating system to the boot disk. The image may include a special partition. The computing device may write the preinstallation environment (associated with first operating system) to the special partition of the image of the second operating system, and create a boot entry in the UEFI to cause the computing device to boot into the preinstallation environment (Windows PE). After booting into the preinstallation environment, the computing device may execute one or more diagnostic tests, delete the boot entry, and reboot the computing device to install a basic input output system (Coreboot) to replace UEFI and install the second operating system (Chrome OS).

19 Claims, 7 Drawing Sheets

(58) Field of Classification Search
USPC ........................................ 717/174–178; 713/2
See application file for complete search history.

(56) References Cited

U.S. PATENT DOCUMENTS

| | | | | |
|---|---|---|---|---|
| 7,219,220 | B2* | 5/2007 | Cherukuri | H04L 69/32 |
| | | | | 713/1 |
| 10,031,736 | B2* | 7/2018 | Lin | G06F 8/65 |
| 10,061,651 | B2* | 8/2018 | Lo | G06F 11/1417 |
| 2004/0006689 | A1* | 1/2004 | Miller | G06F 8/65 |
| | | | | 713/1 |
| 2004/0187104 | A1* | 9/2004 | Sardesai | G06F 8/60 |
| | | | | 717/174 |
| 2005/0262336 | A1* | 11/2005 | Cherukuri | H04L 69/32 |
| | | | | 713/2 |
| 2011/0208929 | A1* | 8/2011 | McCann | G06F 3/0664 |
| | | | | 711/162 |
| 2016/0364297 | A1* | 12/2016 | Lo | G06F 9/441 |
| 2017/0090896 | A1* | 3/2017 | Lin | G06F 8/61 |
| 2020/0233684 | A1* | 7/2020 | Horne | G06F 21/53 |

OTHER PUBLICATIONS

Frazelle, J., Open-source Firmware: Step into the world behind the kernel, Queue, vol. 17, Issue 3, May-Jun. 2019, pp. 40-53, [ retrieved on Sep. 30, 2021], Retrieved from the Internet: <URL:http://dl.acm.org/>.*

* cited by examiner

USING A SINGLE PROCESS TO INSTALL A UEFI-SUPPORTED OS OR A NON-UEFI SUPPORTED OS ON A HARDWARE PLATFORM

BACKGROUND OF THE INVENTION

Field of the Invention

This invention relates generally to computing devices and, more particularly to using a common manufacturing process to install on the same computing device platform either (i) a first basic input output (BIOS), such as a Unified Extensible Firmware Interface (UEFI) BIOS, for a first operating system (OS), such as, for example, Microsoft® Windows, or (ii) a second BIOS, such as coreboot, for a second OS, such as, for example, Google® Chrome.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computing device may have a firmware, known as a basic input output system (BIOS). The BIOS may be stored in non-volatile memory and may be used to perform hardware initialization during a boot process (e.g., power-on). The BIOS may load a boot loader from memory (e.g., random access memory (RAM)) and the bootloader may load an operating system of the computing device.

A manufacturer of computing devices may use a manufacturing process (e.g., core factory infrastructure (FI)) that runs under a Windows Preinstallation Environment (WinPE) operating environment to install an operating system (OS) that is designed to run under a common Unified Extensible Firmware Interface (UEFI) BIOS on a computing device that is being manufactured. For example, operating systems such as Windows, Linux, VMware's ESXi, and the like are designed to run on a computing device having a UEFI BIOS. WinPE enables the manufacturer to run manufacturing diagnostics and automatically configure (e.g., using scripts) a computing device, referred to as the system under test (SUT), because the computing device is released after it has passed the diagnostic tests.

In contrast, Google® Chrome ("Chrome") is an operating system that runs on computing devices that use a non-BIOS firmware known as Coreboot, which does not support Windows. The process for manufacturing a computing device running Chrome includes pre-populating a disk with the Chrome OS environment image using a host system (e.g., a second computing device), installing the disk into the target computing device (e.g., SUT) that already has Coreboot firmware pre-programmed on the motherboard. The SUT is then booted into the Chrome OS environment and the Chrome OS environment runs Chrome diagnostics and Chrome OS setup. For this reason, a manufacturer may have a first manufacturing process to manufacture computing devices that use an OS that executes using a UEFI BIOS and a second manufacturing process to produce computing devices that execute the Chrome OS (e.g., known as Chromebooks).

As the popularity of Chrome grows, a manufacturer may desire to offer the option to install Coreboot and Chrome OS on a UEFI BIOS-based computing device. There are several issues with trying to install Coreboot and Chrome OS on a UEFI BIOS based computing device. First, motherboards supplied to the factory are typically pre-programed with UEFI BIOS by the original design manufacturer (ODM) and UEFI BIOS does not normally support Coreboot and Chrome OS. Second, the SUT (on which Windows OS is to be installed) normally reboots to perform a Final Test in Windows PE, which means that after Coreboot and Chrome OS are installed, the SUT must somehow be made to boot back to Windows PE (WinPE). Third, a disk is typically the only boot media available as the SUT may lack a network interface card (NIC) and lack the ability to boot to Windows PE. Thus, booting to Windows PE from the local disk is a challenge when the Chrome OS image has been written to the disk.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a computing device may boot into a preinstallation environment (Windows PE) associated with a first operating system (e.g., Windows OS), determine that a second operating system (Chrome OS) is to be installed on the computing device, and write an image of the second operating system to the boot disk. The image may include a special partition. The computing device may write the preinstallation environment (of the first operating system) to the special partition of the image of the second operating system, and create a boot entry in the UEFI to cause the computing device to boot into the preinstallation environment (Windows PE). After booting into Windows PE, the computing device may execute one or more diagnostic tests, delete the boot entry, and reboot the computing device to install a second basic input output system (Coreboot) and install the second operating system (Chrome OS).

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
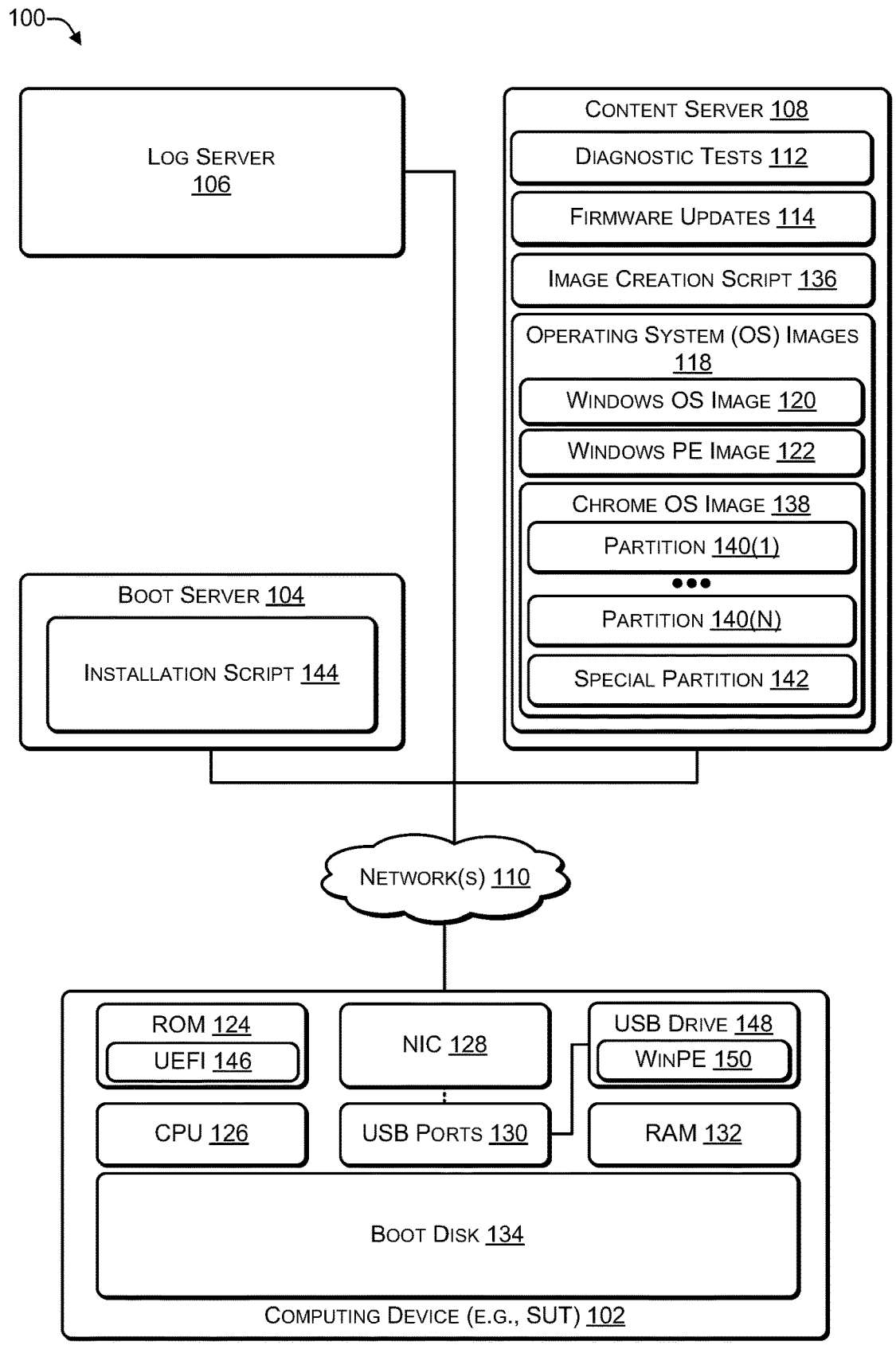
FIG. 1 is a block diagram of a system in which an image creation script is executed to create an operating system (OS) image, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a non-UEFI BIOS and OS (e.g., Coreboot and Chrome) to be installed on a computing device (e.g., a type of information handling system) that comes pre-installed with a UEFI BIOS (e.g., from an ODM). For illustration purposes, Coreboot is used herein as an example of a non-UEFI BIOS and Chrome is used herein as an example of an OS that is not supported by UEFI. However, it should be understood that the systems and techniques described herein may be used with any other non-UEFI BIOS and OS. For illustration purposes, Windows is used herein as an example of an OS that is supported by UEFI. However, it should be understood that the systems and techniques described herein may be used with another UEFI BIOS supported OS, such as Linux, ESXi, or the like.

The systems and techniques use a new WinPE-based installation process that enables installation of either a UEFI BIOS supported OS (e.g., Microsoft® Windows) or the replacement of the UEFI BIOS with another BIOS (e.g., Coreboot) and installation of an OS (e.g., Google® Chrome) that is not supported by UEFI. The WinPE-based installation process enables WinPE-based diagnostic tests to be executed before the OS (e.g., Windows or Chrome) is installed and after the OS is installed. In the case of Coreboot and Chrome, the systems and techniques described herein enable Coreboot and Chrome to be installed on the SUT and then have the SUT boot into Windows PE (WinPE) to enable the post OS installation tests to be performed.

A motherboard that is supplied to a factory by an ODM may be pre-programed with a UEFI BIOS. The motherboard is installed in a device to create the SUT. The SUT starts with UEFI BIOS and runs diagnostic tests created for a WinPE installation process. If the customer has requested that Chrome OS be installed, the SUT is flashed from UEFI BIOS to the Coreboot firmware during the WinPE based manufacturing process. The SUT, during manufacturing, then boots to the Chrome OS to run GRT (Google Required Tests) and setups the Chrome OS. The coordination between these two very different processes is managed by placing a special partition on the Chrome OS image that is written to the boot disk (e.g., a hard disk drive, solid state drive, or the like that has been designated as a device from which to boot the computing device). The customer requested OS is downloaded and installed during the Software Install (SI) phase of the process. The SUT may execute one or more additional diagnostic tests, such as a final test in Windows PE after the SI phase has completed. After the final test(s) have been performed, the SUT may perform a reboot to boot back to Windows PE. In some cases, a USB drive that includes Windows PE may be the boot media initially used by the SUT. For example, the SUT may lack a network interface card (NIC) and/or pre-boot execution environment (PXE) boot capability or the factory environment may not provide the SUT with the ability to boot from other media (due to cost and/or efficiency).

The systems and techniques described herein enable the SUT to boot to Windows PE (WinPE) from the SUT's boot disk after the Chrome OS image has been written onto the disk. In this way, a manufacturing process can use a single disk image (e.g., the Chrome OS image) to boot to both WinPE (UEFI BIOS) and to Chrome OS (Coreboot firmware). The same manufacturing process can also be used to install a UEFI-supported OS (e.g., Windows OS) on the SUT instead of Chrome OS. The diagnostic tests and configuration tests developed to run in Windows PE can be executed on the hardware, regardless of whether Windows OS or Chrome OS is to be installed on the SUT.

The Chrome OS image that is written to disk is modified to enable booting to both WinPE OS (with UEFI BIOS) and to Chrome OS (with Coreboot firmware) during the manufacturing process. Even though both (i) a UEFI BIOS supported OS (e.g., Windows) and (ii) Chrome OS use a different BIOS (e.g., firmware), the common attribute is that the content of both operating systems can co-exist on the same disk by using GPT partitioning. The GUID Partition Table (GPT) is a standard describing a layout of partition tables of a physical computer storage device, such as a hard disk drive or solid-state drive, using universally unique identifiers, which are also known as globally unique identifiers (GUIDs). A conventional Chrome OS image includes 12 partitions. In contrast, the systems and techniques described herein add a special (e.g., 13th) partition to the Chrome OS image. The Chrome OS factory image leaves free space at the end of the disk, which is merged into the customer partition during (e.g., near the end of) the Chrome installation process.

Before the free space is merged into the customer partition in the Chrome installation process, a new partition, referred to herein as a special partition, is added as a thirteenth partition to the existing disk schema. For example, a FAT32 EFI (a File Allocation Table using 32 bits and having an Extensible Firmware Interface) system partition is created at the end of the Chrome OS image. The new 13th partition ("special partition" or "temporary partition"), may be labeled "ESP" (EFI System Partition), and may be a temporary partition that is used during the manufacturing process to enable booting into Windows PE (in addition to Chrome OS). Before the installation process (e.g., the process that installs (i) the UEFI BIOS supported OS or (ii) Coreboot and Chrome OS) completes execution, the installation process deletes the special partition. In this way, the factory installation process can install a non-UEFI BIOS OS (e.g., Chrome) on a SUT that starts with and uses the WinPE UEFI BIOS OS.

Thus, when the Chrome OS image is created, the Chrome OS image that a manufacturer installs on the OS boot disk includes a new special (e.g., 13th) partition that is not present in a conventional Chrome OS image. For example, in a conventional Chrome system, the OS vendor (e.g., Google®) provides a script (typically to the ODM) to pre-build a conventional Chrome OS image, which is then written ("deployed") to the boot disk of the SUT. In contrast, the systems and techniques described herein use a modified script that adds a special (e.g., 13th) partition when creating the Chrome OS image. For example, the special partition may include an EFI system partition GUID ("C12A7328-F81F-11D2-BA4B-00A0C93EC93B") with a format of FAT32, partition size of 1 GB, and labelled "ESP". The modified script is used to create a Chrome OS image (e.g., that includes the special partition) and the Chrome OS image may be sent to factory content servers for deployment to the OS boot disk of SUTs using the WinPE-based manufacturing process.

The UEFI BIOS of the SUT's motherboard (e.g., as received from the ODM) is configured to perform an OS boot from a boot disk of the SUT. The SUT may have one or more disks, with one disk designated as the boot disk. The SUT is setup (e.g., by the ODM) to boot into Windows PE. During the installation process, the SUT boots into Windows PE to run (e.g., execute) various manufacturing diagnostic tests and configuration scripts (e.g., scripts to configure various components of the SUT), before the Software Install (SI) phase begins. During the SI phase, if the order indicates that Chrome OS is to be installed on the SUT, the installation process may move the manufacturing logs off of the disk to a random-access memory (RAM) drive, wipe (e.g., erase or re-format) the boot disk, and deploy (e.g., write) the Chrome OS image (including the special partition) onto the boot disk of the SUT. After the Chrome OS image has been written to the boot disk, the boot disk has the standard 12 partitions plus the special (e.g., 13th) partition. The installation process mounts the special partition and deploys (e.g., writes) the Windows PE image onto the special partition. The installation process creates a UEFI BIOS boot entry called "PEBOOT" to cause the SUT to boot to the Windows PE image located in the special partition of the boot disk, on subsequent reboots. For example, a path to the location of the Windows PE image in the special partition may be added to the UEFI BIOS boot options. At this point in the installation process, because the firmware (e.g., BIOS) of the SUT is UEFI BIOS the SUT is (at this point) unable to boot to Chrome OS. After completion of the software install (SI) phase, the SUT may transition to the Final Test phase. During the Final test phase, the SUT may reboot one or more times to FI Core/WinPE from the special partition on the boot disk.

The SUT completes the Final Test phase under WinPE, e.g., by running final test(s). At the conclusion of the Final Test phase, the installation process flashes the firmware in the read only memory (ROM) that is used to store the BIOS from UEFI BIOS to Coreboot. The flash causes the Coreboot firmware content to be placed into a reserved block of the ROM, such that the Coreboot firmware is not executed until a reboot occurs. After flashing the Coreboot firmware, the installation process (i) removes (e.g., deletes) the FI Core/WinPE content (e.g., files and folders) from the special partition, deletes the "PEBOOT" UEFI BIOS boot entry, and executes a specific set of reset commands. For example, the specific set of reset commands may include a reset to the embedded controller (EC), a chipset reset (e.g., for Intel® based motherboards, a chipset reset resets the Intel® management engine), and a reset of the central processing unit (CPU). During the reboot, the Coreboot firmware is applied after which the SUT boots to the Chrome OS environment to run the Google Required Test (GRT) and Chrome OS setup. The Coreboot firmware is applied means that the ROM (used to store the BIOS) is flashed from UEFI firmware to Coreboot firmware using a tool which runs under UEFI firmware. The Chrome setup process is modified to check for the existence of the special partition. If the modified Chrome setup process finds the special partition on the boot disk, then the special partition is removed (e.g., deleted). The Chrome setup process merges the free disk space (including the space that was occupied by the deleted special partition) into the Chrome customer partition, completing the Chrome setup process.

Thus, the special (e.g., 13th) partition is used in a hybrid manufacturing process to install a non-UEFI BIOS OS (e.g., Chrome) while using the diagnostic and configuration tests that execute under Windows PE (supported by UEFI), in addition to the Google tests (e.g., GRT). The special partition enables the installation process to transition the SUT from the UEFI BIOS and supported OS (e.g., Windows) to the non-UEFI firmware (e.g., Coreboot) and supported OS (e.g., Chrome). The SUT is automatically (e.g., without human interaction) flashed, in real-time, from a UEFI BIOS to a non-UEFI firmware (e.g., Coreboot) during the installation process. In this way, a manufacturer that desires to offer a UEFI BIOS and supported OS (e.g., Windows) and a non-UEFI BIOS (e.g., Coreboot) and OS (e.g., Chrome) is able to use a single installation process for a single hardware platform rather than having to use two separate and distinct installation processes (e.g., a first for UEFI supported operating systems and a second for non-UEFI BIOS supported operating systems). The installation process is able to leverage (e.g., re-use) existing diagnostic tests and configuration tests used to install a UEFI BIOS supported OS even when a non-UEFI BIOS (e.g., Coreboot) and OS (e.g., Chrome) are being installed on the same hardware platform. In this way, the manufacturer can avoid having to support two different and separate manufacturing environments (e.g., building UEFI BIOS OS systems using a FI Core/WinPE process, and building Chrome OS systems using Google's Chrome process). Thus, by using existing resources and modifying specific portions of the installation, additional costs to support the installation of two different BIOS and OS combinations are reduced, because many existing tests and scripts can be re-used (in some cases, with modifications). Because the same installation process is used on the same hardware for both Coreboot and Chrome as well as UEFI and Windows, the same diagnostic tests and configuration tests (e.g., that execute in Windows PE) as existing UEFI BIOS OS systems may be used. In this way, the manufacturer saves costs by not developing new tests. Because the existing installation process script is modified to install Coreboot and Chrome OS, the entire installation is process is automated and executes without user interaction. Because the hardware platform is shared across UEFI BIOS and supported OS (e.g., Windows) and a non-UEFI BIOS (e.g., Coreboot) and supported OS (e.g., Chrome), the manufacturer can avoid the costs to support two different motherboards (e.g., one with Coreboot firmware and one with UEFI BIOS). Instead, a single UEFI BIOS motherboard (e.g., that has already been designed and is being used to manufacture computing devices with a UEFI BIOS and Windows) is used for both OS offerings. In addition, the conventional process to build a Chrome system involves human interaction because in the conventional Chrome installation process, the boot disk is manually connected to a host computing system, the Chrome image is written onto the boot disk via the host computing system, the boot disk is manually disconnected from the host computing system and manually installed into the target computing device (e.g., the SUT). Thus, an additional benefit of the systems and techniques described herein is that an automated process is used to write the Chrome image to the boot disk during the installation process, without any human interaction. The examples provided herein use UEFI BIOS and Windows as examples of a first BIOS and a first OS and use Coreboot and Chrome as examples of a second BIOS and a second OS. However, it should be appreciated that the systems and techniques described herein may be easily adapted to enable a manufacturer to select one of multiple BIOS and one of multiple OS on a single hardware platform.

As an example, a computing device may include a plurality of hardware components, such as, for example, a read only memory (ROM) storing a Unified Extensible Firmware Interface (UEFI), a boot disk, one or more ports, one or more processors, and one or more non-transitory computer readable media. The one or more non-transitory computer readable media may store instructions executable by the one or more processors to perform various operations. For example, the operations may include booting into a preinstallation environment (e.g., Windows PE) of a first operating system (e.g., Windows) that is located on a memory drive that is connected to a particular port of the one or more ports. The operations may include determining that a second operating system (e.g., Chrome) is to be installed onto the computing device and writing an image of the second operating system to the boot disk. The image may include a special partition. The preinstallation environment of the first operating system (e.g., Windows PE) may be written to the special partition of the image of the second operating system (e.g., Chrome OS). The operations may include creating a boot entry in the UEFI to cause the computing device to boot into the preinstallation environment of the first operating system (e.g., Windows PE) that is located in the special partition. The operations may include booting the computing device to the preinstallation environment of the first operating system (e.g., Windows PE) that is located in the special partition and executing one or more diagnostic tests.

The operations may include booting the computing device into the second operating system. For example, booting the computing device into the second operating system may include writing Coreboot firmware into a reserved area of the ROM. The operations may include initiating a reset of an embedded controller of the computing device, initiating a chipset reset of a chipset associated with the one or more processors, and initiating a processor reset of the one or more processors. The operations may include rebooting the computing device, and installing the Coreboot firmware into the ROM, thereby overwriting the UEFI. The boot entry in the UEFI (e.g., that caused the computing device to boot into the preinstallation environment of the first operating system) may be deleted. The computing device may boot using the Coreboot firmware, initiate a setup of the second operating system (e.g., Chrome OS) to install the second operating system into the boot disk, and execute one or more tests (e.g., Google Required Tests) associated with the second operating system. The operations may include deleting the special partition (e.g., including the preinstallation environment of the first operating system) and merging free space of the boot disk into a customer partition.

FIG. 1 is a block diagram 100 of a system in which an image creation script is executed to create an operating system (OS) image, according to some embodiments. FIG. 1 includes computing device 102, connected to one or more servers, such as, for example, a boot server 104, a log server 106, and a content server 108, via one (or more) network(s) 110. The computing device 102 is also referred to as the system under test (SUT). The computing device 102 may be provided (e.g., by an original design manufacturer (ODM)) with a Unified Extensible Firmware Interface (UEFI) basic input/output system (BIOS). The boot server 104 may comprise a pre-boot execution Environment PXE boot server that is a combination of a Dynamic Host Configuration Protocol (DHCP) server and a Trivial File Transfer Protocol (TFTP) server. The boot server 104 may respond to requests from a diskless station (e.g., the computing device 102) over the network 110, allocate an IP address via DHCP, push data to the stations to enable the diskless station to boot over a local area network (LAN) even without a boot disk. PXE is a standard client/server interface that allows networked computers that are not yet loaded with an operating system to be configured and booted remotely by an administrator. The PXE code may enable the boot server 104 to remotely configure and remotely boot the computing device 102. The PXE may provide: (i) Dynamic Host Configuration Protocol (DHCP), to enable the computing device 102 to receive an IP address to gain access to the servers 102, 104, 106 and (ii) a set of application program interfaces (API) that are used by the BIOS of the computing device 102 to automate configuration steps such as the booting the operating system, and (iii) a method of initializing the PXE code in the PXE ROM chip or boot disk.

The content server 108 may include multiple diagnostic tests 112, one or more firmware updates 114, at least one image creation script 116, and multiple operating system (OS) images 118. In some cases, a different subset of the diagnostic tests may be run (e.g., executed) at different stages in an installation process that is used to install an OS on the computing device 102. The firmware updates 114 may include updated firmware for one or more components of the computing device 102, such as, for example, a network interface card (NIC), various ports, one or more drives, and the like. A portion of the diagnostic tests 112 may check if a current firmware in individual components of the computing device 102 is a current firmware version and, if a newer version is available in the firmware updates 114, install the updated firmware during the software installation process.

The OS images 118 may include a Windows OS image 120, and a Windows Preinstallation Environment (PE) image 122. The Windows OS image 120 may include an image of a currently supported Windows OS, such as Windows 10 or later. The Windows PE (also referred to as "WinPE") image 122 may be a lightweight version of Windows used as an environment in which to deploy a currently supported Windows version to the computing device 102. The Windows PE image 122 may be booted via a universal serial bus (USB) flash drive, the PXE boot server 104, a compact disk read only memory (CD-ROM) or other optical media, hard disk (e.g., boot disk), or another type of bootable media.

The computing device 102 may include a read only memory (ROM) 124, a central processing unit (CPU) 126, a network interface card (NIC) 128, one or more USB ports, random access memory (RAM) 132, and a boot disk 134. The computing device 102 may be configured (e.g., by the ODM) to boot from the boot disk 134. Of course, the computing device 102 may include multiple disk drives, with one of the multiple disk drives designated as a boot disk. For ease of illustration, only the boot disk 134 is illustrated. It should be understood that other drives may be present in the computing device 102. The NIC 128 may be a component of a motherboard of the computing device 102 or the NIC 128 may be a USB-based NIC that is temporarily connected to one of the USB ports 130 during the installation process. The ROM 124 may be an electrically erasable programmable ROM (EEPROM) or another type of ROM that can be reprogramed.

In some cases, a USB drive (e.g., a USB RAM drive) 148 that includes WinPE 150 may be connected to one of the USB ports 130. For example, if the computing device 102 does not include the NIC 128 (or the driver for the NIC 128 has not yet been loaded), the USB drive 148 may be used to initiate the installation process by enabling the computing device 102 to boot into Windows PE (WinPE) 150. In such cases, the USB drive 148 may be removed after the installation process has been initiated, e.g., after the Chrome OS image 138 has been written to the boot disk 134 and after the Windows PE image 122 has been written to the special partition 142 on the boot disk 134.

The ROM 124 may be supplied by an ODM with a UEFI BIOS 146. Thus, when the installation process begins, the ROM 124 includes the UEFI BIOS 146. A boot option in the UEFI BIOS 146 may be configured to boot the computing device 102 from the boot disk 134. The computing device 102 may be configured to boot to WinPE (or similar installation environment).

The content server may execute (e.g., run) an image creation script 136 to create a Chrome OS image 138. For example, the image creation script 136 may create the Chrome OS image 138 that includes multiple partitions 140(1) to 140(N) (N>0) and a special partition 142. For example, the partitions 140 may be twelve partitions (e.g., N=12) used by Chrome OS and the special partition 142 may be a thirteenth partition. Of course, a different OS or a different version of Chrome OS may use a different number of partitions.

When the Chrome OS image 138 is written to an SUT, such as the computing device 102, the special partition 142 of the Chrome OS image 138 enables booting to both WinPE OS and to Chrome OS during the manufacturing process. Though both (i) a UEFI BIOS supported OS (e.g., Windows) and (ii) Chrome OS use a different BIOS (e.g., Coreboot), the common attribute is that the content of both operating systems can co-exist on the same boot disk using GPT partitioning. The Chrome OS image 138 includes free space at the end of the boot disk, which is merged into a customer partition (e.g., one of the partitions 140) during (e.g., near the end of) the Chrome installation process. The special partition 142 may be a FAT32 system partition that is created at the end of the Chrome OS image 138. The special partition 142 may be labeled "ESP" (EFI System Partition), and may be a temporary partition that is used during the manufacturing process to enable booting into both Windows PE and to Chrome OS. Before the installation process completes execution, the installation process deletes the special partition 142. In this way, the factory installation process can install a non-UEFI BIOS OS (e.g., Chrome OS) on computing device 102 that starts with UEFI BIOS and WinPE OS.

Thus, the Chrome OS image 138 that is to be installed on the boot disk 134 may include the partitions 124(1) to 124(N) the special partition 142. The special partition 142 may include, for example, an EFI system partition GUID ("C12A7328-F81F-11D2-BA4B-00A0C93EC93B") with a format of FAT32, partition size of 1 GB, and labelled "ESP". Thus, the image creation script 136 is used to create the Chrome OS image 138 that includes the special partition 142. The Chrome OS image 138 may be deployed to the boot disk of each SUT in a WinPE-based manufacturing process. The special partition may enable the computing device 102 to boot into WinPE (e.g., to run the WinPE-based diagnostic tests 112) and to install either the Windows OS image 120 (e.g., Windows 10) or Coreboot (to replace UEFI 146) and the Chrome OS image 122 on the computing device 102.

Figure 2:
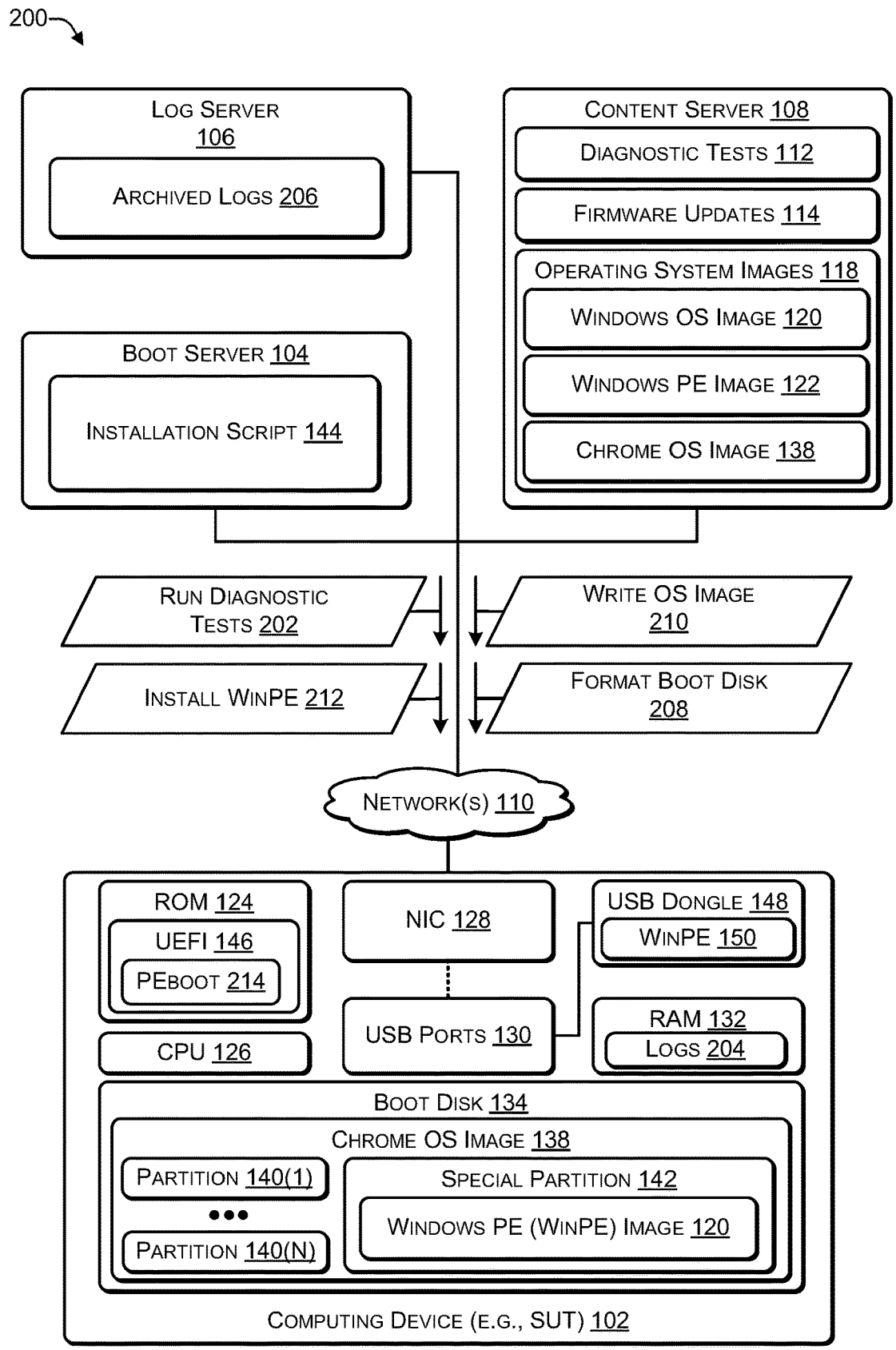
FIG. 2 is a block diagram of a system in which an OS image is written to a boot disk, according to some embodiments.

FIG. 2 is a block diagram 200 of a system in which an OS image is written to a boot disk, according to some embodiments. FIG. 2 describes the software installation (SI) phase of the installation process.

One of the servers 104, 106, or 108 may execute an installation script 144 to install an OS, and in some cases, a different BIOS than UEFI to the computing device 102. The installation script 144 may be used to install a UEFI-supported OS (e.g., Windows OS) on the computing device 102 or a non-UEFI supported OS, such as, for example, Chrome OS. Windows OS and Chrome OS are used for illustration purposes herein and the same techniques may be used to install one of multiple operating systems, such as, for example, Windows OS, Chrome OS, Linux, ESXi, Apple® iOS, Apple® MacOS, and the like. In this way, a manufacturer may receive a computing device from an ODM that includes UEFI and use the same installation script 144 to install a UEFI BIOS-supported OS or install a non-UEFI BIOS (e.g., Chromeboot) and supported OS.

The installation script 144 may initiate a reboot of the computing device 102 causing the computing device 102 to boot into WinPE (e.g., from the USB drive 148)®. The installation script 144 may send an instruction, e.g., run diagnostic tests 202, to cause one or more of the diagnostic tests 112 to be performed to the computing device 102. For example, the diagnostic tests 112 may test audio components (e.g., microphone, speaker, audio input and output jacks, Bluetooth, camera, the CPU 126, a display device (e.g., for a tablet, a laptop or the like), a system fan, a CPU fan, various input/output (I/O) ports (e.g., the USB ports 130, one or more display ports such as VGA, DVI, HDMI, Thunderbolt, or the like), a keyboard (e.g., for a tablet, a laptop or the like), BIOS (e.g., verify that the BIOS version is correct), the RAM 132, the NIC 128, another test of other components of the computing device 102, or any combination thereof. The diagnostic tests 112 may also modify a configuration of the computing device 102 by turning on or off particular features, such as, for example, turning off a color management module (CMM), turning off a trusted platform module (TPM), configuring boot settings (e.g., boot order), and the like. In some cases, the diagnostic tests 112 may identify a version number of currently installed firmware of various components of the computing device 102 and update the current firmware with updated firmware using the firmware updates 114 (e.g., if updated firmware is available).

In some cases, logs 204 resulting from running the diagnostic tests 112 may be temporarily moved from the boot disk 134 to a RAM drive in the RAM 132 to enable the boot disk 134 to be wiped and a new OS (e.g., the Windows OS image 120 or the Chrome OS image 138) to be installed. In some cases, the logs 204 may be sent to the log server 106 to enable the logs 204 to be archived as archived logs 206. The installation script 144 may cause a format boot disk 208 instruction to be performed, thereby wiping (e.g., deleting contents of) the boot disk 134.

The installation script 144 may determine whether a customer order associated with the computing device 102 specifies Chrome OS or Windows OS and then write an OS image 204 to the boot disk 134. For example, if the installation script 144 determines that the order specifies Windows OS, the write OS image 204 may write the Windows OS image 120 to the boot disk 134, and the normal Windows OS installation process may continue. If the installation script 144 determines that the order specifies Chrome OS, then the write OS image 204 may write the Chrome OS image 138 to the boot disk 134.

After the Chrome OS image 138 has been written to the boot disk 134, the boot disk 134 may have the standard partitions 1400 to 140(N) (e.g., N=12 for current Chrome OS installations) plus the special (e.g., 13th) partition 142. The installation script 144 may mount the special partition 142 and deploy (e.g., write) the Windows PE image 120 onto the special partition 142 of the Chrome OS image 138 on the boot disk 134. The installation script 144 may create a boot entry in the UEFI BIOS 146 called PEboot 214 (e.g., a path to the boot file) to cause the computing device 102 to boot the Windows PE image 120 from the special partition 142 of the boot disk 134 on subsequent reboots. For example, a path to the location of the executable file of the Windows PE image 120 in the special partition 142 may be added to the boot options of the UEFI BIOS 146. In some cases, the logs 204 may be moved from the RAM 132 to one of the partitions 140, 142 of the boot disk 134. If the USB drive 148 was being used to boot to WinPE, the USB drive 148 may be removed.

At this point in the installation process, because the BIOS ROM 124 of the computing device 102 includes the UEFI BIOS 146, the computing device 102 may be unable to boot to Chrome OS. At the completion of the software install (SI) phase, the computing device 102 may transition to a Final Test phase.

During the Final Test phase, the computing device 102 may reboot one or more times to WinPE using the Windows PE image 120 from the special partition 142 on the boot disk 134. The computing device 102 may complete the Final Test phase in the Windows PE (WinPE), e.g., by running one or more final test(s) from the diagnostic tests 112. In this way, tests developed for execution in Windows PE can continue to be executed, even if Chrome OS is to be installed on the computing device 102.

Thus, an installation process may determine if Windows OS or Chrome OS is to be installed on a computing device. If the installation process determines that Windows OS is to be installed, the installation process may use a standard Windows OS installation. If the installation process determines that Chrome OS is to be installed, the installation process may move any logs from the boot disk to a RAM drive (or archive the logs), wipe the boot disk, and install a chrome OS image that includes the standard Chrome partitions as well as a special partition on the boot disk. The installation process may deploy (e.g., write) a Windows PE image to the special partition and create a boot entry in the boot options of the UEFI BIOS to boot using the Windows PE image on the special partition, causing the computing device (e.g., SUT) to boot to Windows PE (WinPE) in subsequent reboots. In this way, WinPE can be used to execute previously developed diagnostic tests on the hardware components of the computing device. Thus, the manufacturer avoids having to develop new diagnostic tests when installing Chrome OS on the same hardware on which Windows OS may be installed.

Figure 3:
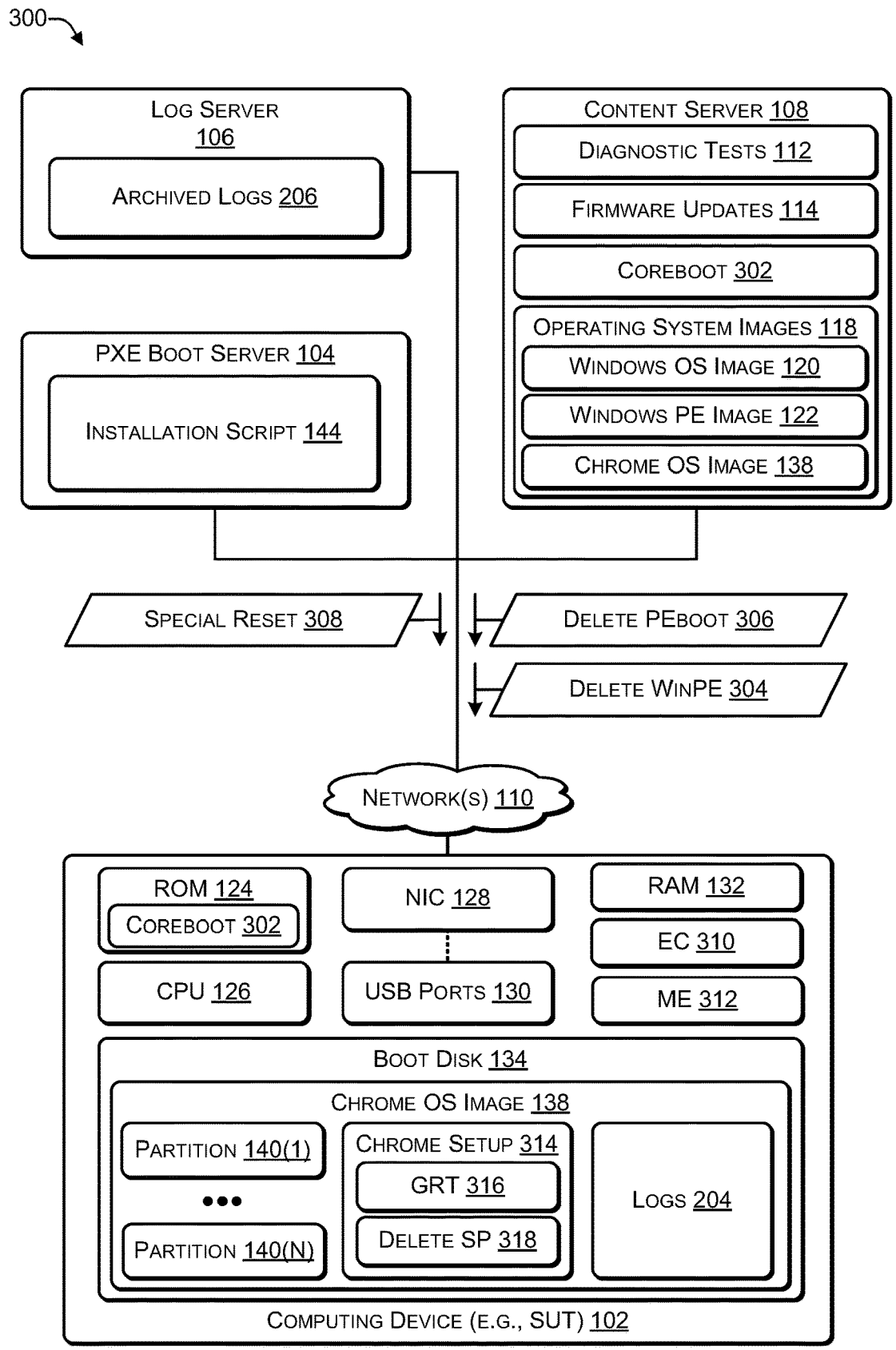
FIG. 3 is a block diagram of a system in which an OS setup is performed, according to some embodiments.

FIG. 3 is a block diagram 300 of a system in which an OS setup is performed, according to some embodiments. At the conclusion of the Final Test phase, the installation script 144 may determine whether an order associated with the computing device 102 specifies Windows OS or Chrome OS. If the order specifies that the computing device 102 is to use Windows OS, the installation script 144 may boot the computing device 102, using the UEFI BIOS 146 of FIG. 2, into the Windows OS image 120 that was written to the boot disk 134 and perform a cleanup by deleting unneeded files and/or folders that were created during the installation process.

If the order specifies that the computing device 102 use Chrome OS, the installation script 144 may flash (e.g., write) Coreboot firmware 302 into the ROM 124. For example, the flash may cause the Coreboot firmware 302 to be placed into a reserved portion of the ROM 124, such that the Coreboot firmware 302 is not executed until the computing device 102 reboots.

After flashing the Coreboot firmware 302 to the ROM 124, the installation script 144 may send a delete WinPE instruction 304 to cause removal (e.g., deletion) of the WinPE content (e.g., the Windows PE image 120) from the special partition 142 of FIG. 2. The installation script 144 may send a delete PEboot instruction 306 to cause removal (e.g., deletion) of the PEboot 214 entry in the UEFI BIOS 146 of FIG. 2. The delete PEboot instruction 306 may perform a cleanup by deleting unneeded files and/or folders that were created during the installation process.

The installation script 144 may send a special reset 308 that includes a set (e.g., of one or more) reset commands. For example, the special reset 308 may cause a reset to an embedded controller (EC) 310, a chipset reset (e.g., for Intel® based motherboards, a chipset reset resets the Intel® management engine (ME) 312), and a reset of the central processing unit (CPU) 126. The special reset 308 may cause the computing device 102 to reboot. During the reboot, the Coreboot firmware 302 may be applied, e.g., causing the Coreboot firmware 302 to be installed into an executable area of the ROM 124, e.g., the ROM 124 (that is used to store the BIOS) is flashed from UEFI firmware 146 of FIG. 2 to the Coreboot firmware 302 using a tool which runs under the UEFI firmware 146.

After the Coreboot firmware 302 is applied to the ROM 124, the computing device 102 may boot to the Chrome OS environment, e.g., using the Chrome OS image 138 that is installed on the boot disk 134. Because the computing device 102 is booting to the Chrome OS environment for the first time, the computing device 102 may run a Chrome setup 314 (e.g., a setup script). For example, the Chrome setup 314 may run one or more Google Required Tests (GRT) 316 and setup Chrome OS on the boot disk 134. The Chrome setup 314 may check for the existence of the special partition 142 of FIG. 2. If the Chrome setup 314 determines that the special partition 142 is located on the boot disk 134, then the Chrome setup 314 may perform delete SP 318 to delete (e.g., remove) the special partition 142. The Chrome setup 314 may merge the free disk space (including the space that was occupied by the deleted special partition) into a Chrome customer partition (e.g., one of the partitions 140), thereby completing the Chrome setup process.

Thus, as described in FIGS. 1, 2, and 3, a special partition is created on a Chrome OS image and used to store Windows PE to enable a single manufacturing process to install either (i) a UEFI BIOS supported OS (e.g., Windows OS) or (ii) a non-UEFI BIOS OS (e.g., Chrome). The Chrome OS image with the special partition that includes Windows PE enables a manufacturer to install Windows OS or Coreboot and Chrome OS on the same hardware while using the diagnostic and configuration tests that execute under UEFI BIOS-based Windows PE. In addition, when Chrome OS is installed, the standard Google tests (e.g., GRT) are run in addition to the diagnostic tests that are run in Windows PE. The special partition enables the installation process to transition the SUT (e.g., computing device) from the UEFI BIOS OS environment to the non-UEFI firmware OS environment. The SUT is automatically (e.g., without human interaction) flashed, in real-time, from a UEFI BIOS to a non-UEFI firmware (e.g., Coreboot) during the installation process. In this way, a manufacturer that desires to offer a UEFI BIOS and supported OS (e.g., Windows) and a non-UEFI BIOS (e.g., Coreboot) and OS (e.g., Chrome) is able to use a single installation process for a single hardware platform rather than having to use two separate and distinct installation processes (e.g., a first process for UEFI supported operating systems and a second process for non-UEFI BIOS supported operating systems. The installation process is able to leverage (e.g., re-use) existing diagnostic tests and configuration tests used to install a UEFI BIOS supported OS even when a non-UEFI BIOS (e.g., Coreboot) and OS (e.g., Chrome) are being installed on the same hardware platform. In this way, the manufacturer can avoid having to support two different and separate manufacturing environments (e.g., building UEFI BIOS OS systems using a Windows PE process, and building Chrome OS systems using Google's Chrome process).

Thus, by using existing resources and modifying specific portions of the installation, additional costs to support the installation of two different BIOS and OS combinations are avoided, because existing tests and scripts that run in Windows PE can be re-used (without modification or, in some cases, with minor modifications). Because the same installation process is used with the same hardware for both (i) Coreboot and Chrome as well as (ii) UEFI and Windows, the same diagnostic tests and configuration tests (e.g., that execute under WinPE) used when building existing UEFI BIOS based OS computing devices may be used. In this way, the manufacturer saves costs by not developing new tests.

Because the existing installation process script is modified to install Coreboot and Chrome OS, the entire installation process is automated and executes without human interaction. Because the hardware platform is shared between (i) a UEFI BIOS and supported OS (e.g., Windows, Linux, and the like) and a non-UEFI BIOS (e.g., Coreboot) and supported OS (e.g., Chrome), the manufacturer can avoid the costs to support two different motherboards (e.g., one with Coreboot firmware and one with UEFI BIOS). Instead, a single UEFI BIOS motherboard (e.g., that has already been designed and is being used to manufacture computing devices with a UEFI BIOS and Windows OS) may be used to offer both Windows OS and Chrome OS.

In addition, the conventional process to install Chrome OS on a computing device (e.g., SUT) involves human interaction because in the conventional Chrome installation process, the boot disk is manually connected to a host computing system, the Chrome image is written onto the boot disk via the host computing system, the boot disk is manually disconnected from the host computing system and manually installed into the target computing device (e.g., the SUT). Thus, an additional benefit of the systems and techniques described herein is that an automated process is used to write the Chrome image to the boot disk during the installation process, without any human interaction.

The examples provided herein use UEFI BIOS and Windows as examples of a first BIOS and a first OS and use Coreboot and Chrome as examples of a second BIOS and a second OS. However, it should be appreciated that the systems and techniques described herein may be easily adapted to enable a manufacturer to select one of multiple BIOS and one of multiple OS on a single hardware platform.

Figure 4:
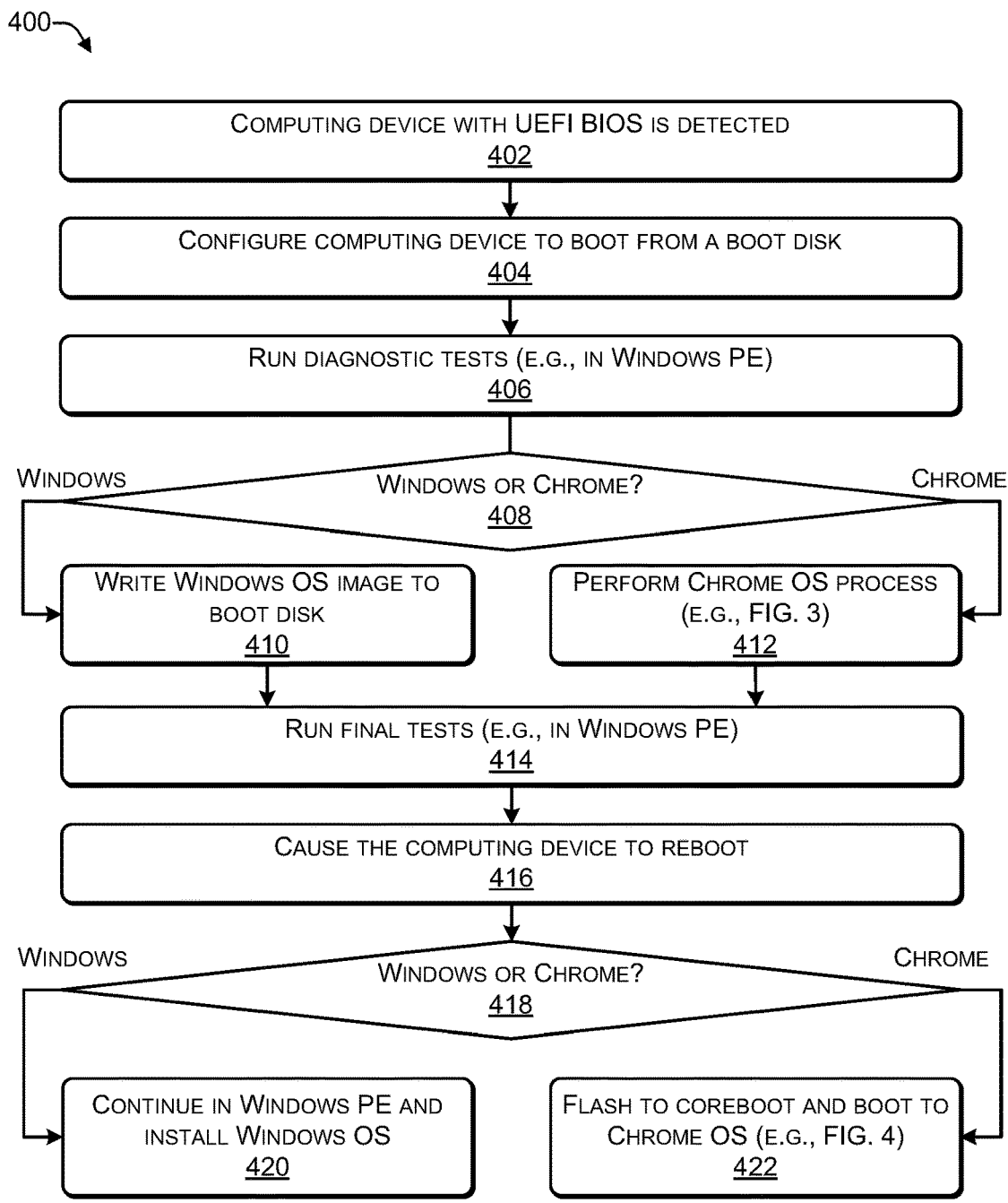
FIG. 4 is a flowchart of a process that includes determining whether to install a first OS (Windows) or a second OS (Chrome), according to some embodiments.
Figure 5:
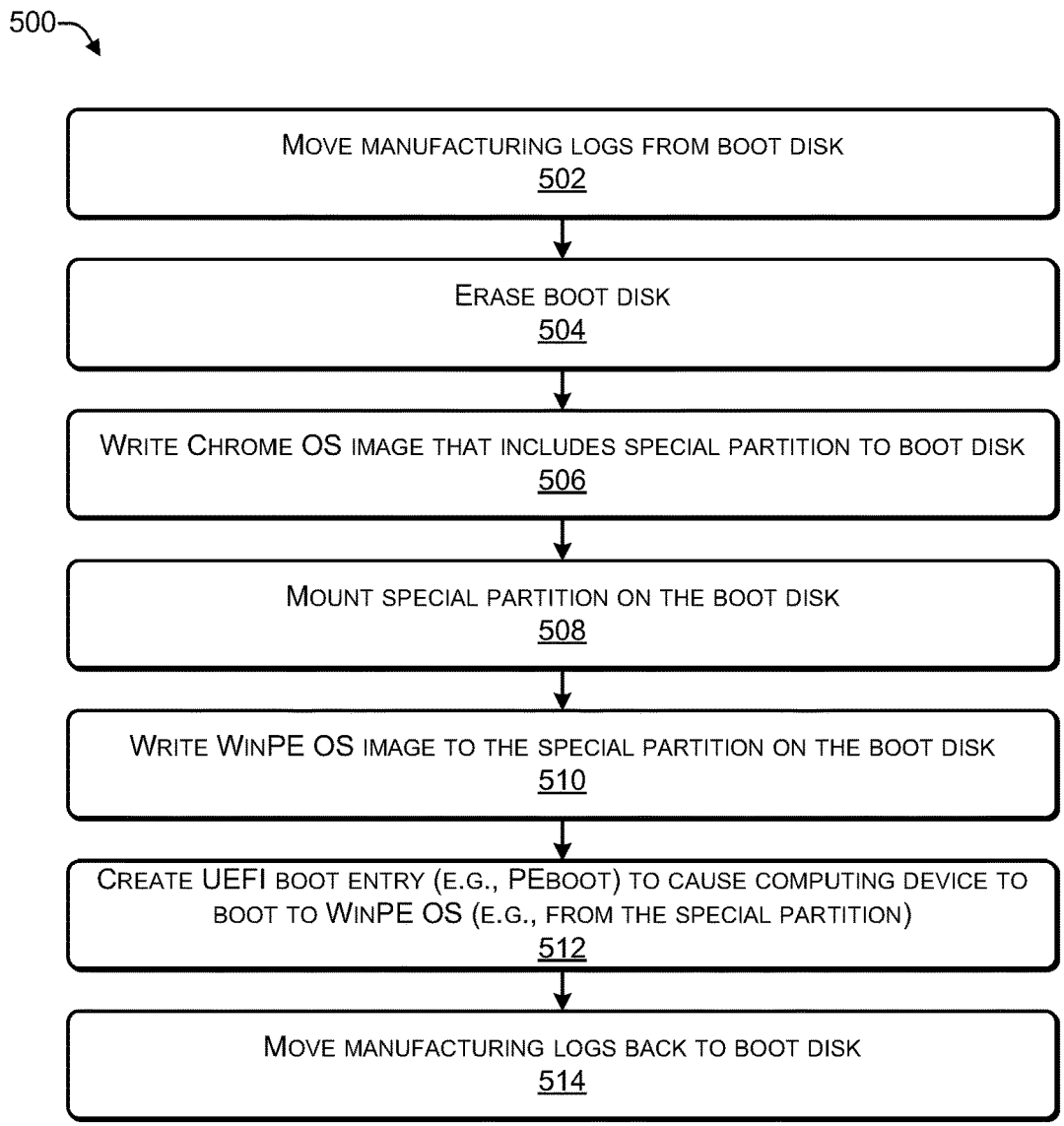
FIG. 5 is a flowchart of a process that includes writing a Chrome OS factory image to a storage device, according to some embodiments.
Figure 6:
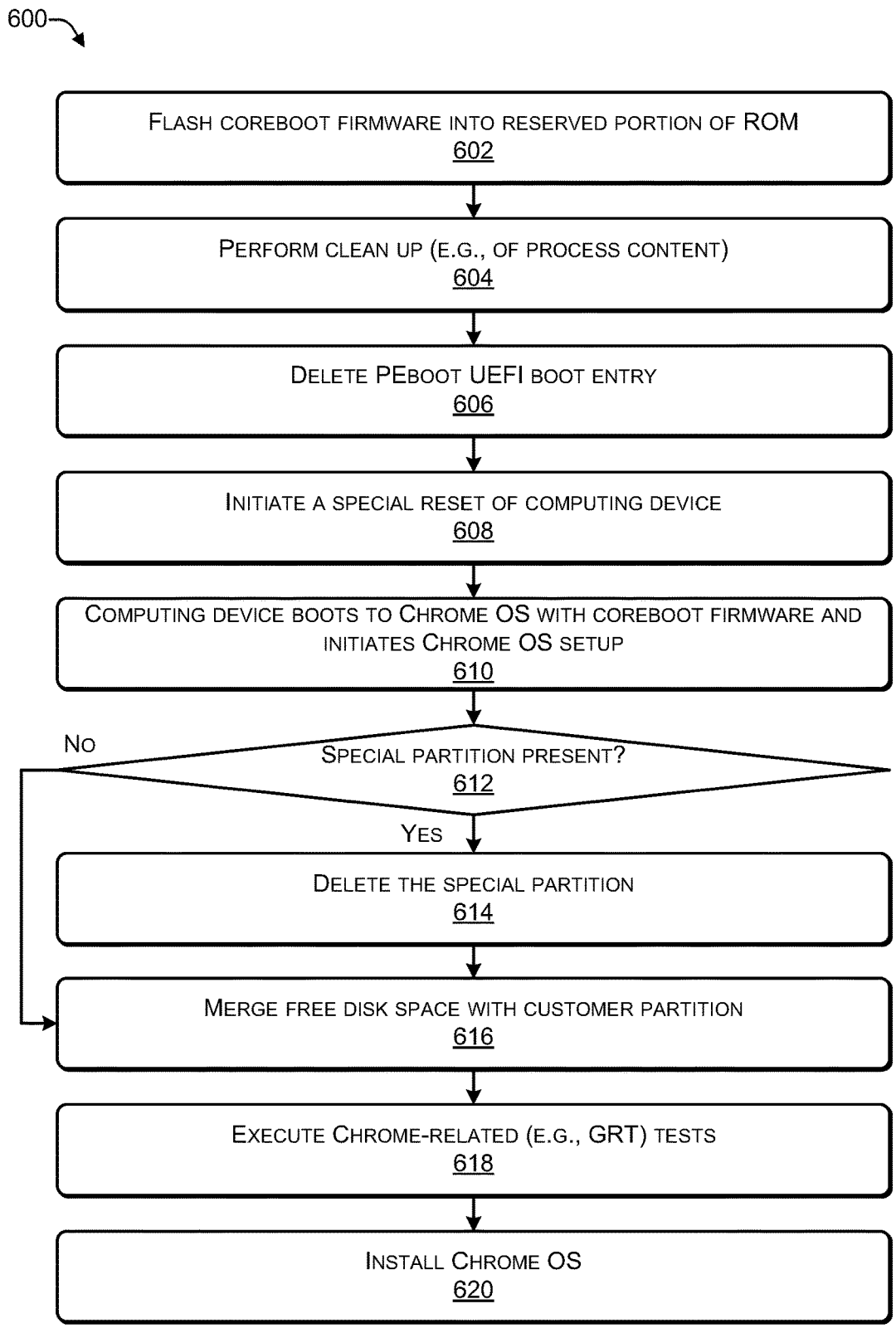
FIG. 6 is a flowchart of a process that includes deleting a special partition, according to some embodiments.

In the flow diagram of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1, 2, and 3, as described above, although other models, frameworks, systems and environments may be used to implement these processes.

FIG. 4 is a flowchart of a process 400 that includes determining whether to install a first OS (Windows) or a second OS (Chrome), according to some embodiments. The process 400 may be performed by the CPU 126 of FIGS. 1, 2, and 3.

At 402, the process may detect that a computing device with a UEFI BIOS is present. At 404, the process may configure the computing device to boot from a boot disk. At 406, one or more diagnostic tests may be executed (e.g., in WinPE). For example, in FIG. 1, the ROM 124 may include the UEFI BIOS 146. A boot option in the UEFI BIOS 146 may be configured to boot the computing device 102 from the boot disk 134. The computing device 102 may be configured to boot to WinPE (or similar installation environment). The installation script 144 may cause one or more of the diagnostic tests 112 to be performed to the computing device 102.

At 408, the process may determine (e.g., based on a customer order), whether to install Windows OS or Chrome OS. If the process determines, at 408, that Windows OS is to be installed, the process may write a Windows OS image to a boot disk, and the process proceeds to 414. If the process determines, at 408, that Chrome OS is to be installed, the process may perform a Chrome OS installation process, as described in more detail in FIG. 3, and the process may proceed to 414. For example, in FIG. 2, the installation script 144 may determine whether a customer order associated with the computing device 102 specifies Chrome OS or Windows OS and write an OS image 204 to the boot disk 134. For example, if the installation script 144 determines that the order specifies Windows OS, the write OS image 204 may write the Windows OS image 120 to the boot disk 134, and the normal Windows OS installation process may continue. If the installation script 144 determines that the order specifies Chrome OS, then the write OS image 204 may write the Chrome OS image 138 to the boot disk 134.

At 414, the process may perform one or more final tests (e.g., in Windows PE). At 416, the process may instruct the computing device to reboot. For example, in FIG. 1, during a Final Test phase, the computing device 102 may reboot one or more times into WinPE using the Windows PE image 120 from the special partition 142 on the boot disk 134. The computing device 102 may complete the Final Testing phase in WinPE, e.g., by running one or more final test(s) from the diagnostic tests 112.

At 418, the process may determine (e.g., based on a customer order), whether to install Windows OS or Chrome OS. If the process determines, at 418, that Windows OS is to be installed, the process may continue in Windows PE and install Windows OS, at 420. If the process determines, at 418, that Chrome OS is to be installed, the process may flash to Coreboot and boot to Chrome OS, at 422, as described in more detail in FIG. 4. For example, in FIG. 3, after the Final Test phase, the installation script 144 may determine whether an order associated with the computing device 102 specifies Windows OS or Chrome OS. If the order specifies that the computing device 102 is to use Windows OS, the installation script 144 may boot the computing device 102, using the UEFI BIOS 146 of FIG. 2, into the Windows PE image 120 that was written to the boot disk 134 and perform a cleanup by deleting unneeded files and/or folders that were created during the installation process. If the order specifies that the computing device 102 use Chrome OS, the installation script 144 may flash (e.g., write) Coreboot firmware 302 into the ROM 124, delete the WinPE content (e.g., the Windows PE image 120) from the special partition 142, and delete the PEboot 214 entry in the UEFI BIOS 146 of FIG. 2. The delete PEboot instruction 306 may perform a cleanup by deleting unneeded files and/or folders that were created during the installation process. The installation script 144 may send a special reset 308 that causes the computing device 102 to reboot. During the reboot, the Coreboot firmware 302 may be applied, e.g., causing the Coreboot firmware 302 to be installed into an executable area of the ROM 124, e.g., the ROM 124 (that is used to store the BIOS) is flashed from UEFI firmware 146 of FIG. 2 to the Coreboot firmware 302 using a tool which runs under the UEFI firmware 146. After the Coreboot firmware 302 is applied to the ROM 124, the computing device 102 may boot to the Chrome OS environment, e.g., using the Chrome OS image 138 that is installed on the boot disk 134. Because the computing device 102 is booting to the Chrome OS environment for the first time, the computing device 102 may run a Chrome setup 314 (e.g., a setup script). For example, the Chrome setup 314 may run one or more Google Required Tests (GRT) 316 and setup Chrome OS on the boot disk 134. The Chrome setup 314 may check for the existence of the special partition 142 of FIG. 2. If the Chrome setup 314 determines that the special partition 142 is located on the boot disk 134, then the Chrome setup 314 may perform delete SP 318 to delete (e.g., remove) the special partition 142. The Chrome setup 314 may merge the free disk space (including the space that was occupied by the deleted special partition) into a Chrome customer partition (e.g., one of the partitions 140), thereby completing the Chrome setup process.

Thus, the same installation process may be used with the same hardware platform to install either (i) Coreboot and Chrome or (ii) Windows. For example, a special partition may be added at the end of the Chrome OS image and Windows PE installed in the special partition to enable the computing device to boot into Windows PE. Thus, regardless of whether Windows OS or Chrome OS is being installed, most of the installation process is executed in Windows PE. In this way, the diagnostic tests and configuration tests developed for Windows PE may be used for a computing device on which either Chrome OS or Windows OS is to be installed, thereby providing the manufacturer with cost savings by not developing new tests. After most of the installation procedure, including diagnostic tests, have been performed in Windows PE, if Chrome OS is to be installed, Coreboot is flashed into the ROM (e.g., that is used to store the BIOS), and the computing device rebooted. During the reboot, Coreboot is installed as the BIOS (e.g., replacing UEFI), Chrome OS begins executing, and the GRT are performed. The Google installation script deletes the Windows PE content from the boot disk and deletes the special partition. The extra space at the end of the boot disk (including the space that was occupied by the now deleted special partition) is merged with a user partition. Thus, because the special partition is deleted and the space remaining in the boot disk is merged with the customer partition, the customer that receives a computing device with Coreboot and Chrome OS installed may be unable to determine that (i) the computing device initially had a UEFI BIOS and (ii) much of the installation occurred in Windows PE.

FIG. 5 is a flowchart of a process 500 that includes writing a Chrome OS factory image to a storage device, according to some embodiments. The process 500 may be performed by the CPU 126 of FIGS. 1, 2, and 3. FIG. 5 provides more details regarding performing 412 of FIG. 4.

At 502, the process may move manufacturing logs from a boot disk (e.g., before the boot disk is wiped). At 504, the boot disk may be erased (e.g., wiped). At 506, the process may write a Chrome OS image that includes a special partition to the boot disk. For example, in FIG. 2, the logs 204 resulting from running the diagnostic tests 112 may be moved from the boot disk 134 to a RAM drive in the RAM 132 to enable the boot disk 134 to be wiped and a new OS (e.g., the Windows OS image 120 or the Chrome OS image 138) to be installed. The installation script 144 may wipe (e.g., delete contents of) the boot disk 134. After the installation script 144 determines that the order specifies Chrome OS, the installation script 144 may write the Chrome OS image 138 that includes the special partition 142, to the boot disk 134.

At 508, the process may mount the special partition on the boot disk. At 510, the process may write a WinPE OS image to the special partition on the boot disk. At 512, the process may add a UEFI boot entry (e.g., PEboot) to cause the computing device to boot to Windows PE (WinPE) from the special partition on the boot disk. At 514, the manufacturing logs may be moved back to the boot disk. For example, in FIG. 2, after the Chrome OS image 138 has been written to the boot disk 134, the boot disk 134 may include the standard partitions 1400 to 140(N) (e.g., where N=12) plus the special (e.g., 13th) partition 142. The installation script 144 may mount the special partition 142 and deploy (e.g., write) the Windows PE image 120 onto the special partition 142 of the Chrome OS image 138 on the boot disk 134. The installation script 144 may create a boot entry in the UEFI BIOS 146 called PEboot 214 (e.g., a path to the boot file) to cause the computing device 102 to boot the Windows PE image 120 from the special partition 142 of the boot disk 134 on subsequent reboots. For example, a path to the location of the executable file of the Windows PE image 120 in the special partition 142 may be added to the boot options of the UEFI BIOS 146. In some cases, the logs 204 may be moved from the RAM 132 to one of the partitions 140, 142 of the boot disk 134.

Thus, an installation process may determine if Windows OS or Chrome OS is to be installed on a computing device. If the installation process determines that Windows OS is to be installed, the installation process may use a standard Windows OS installation. If the installation process determines that Chrome OS is to be installed, the installation process may move logs generated during the installation process from the boot disk to a RAM drive (or archive the logs), wipe the boot disk, and install a chrome OS image that includes the standard Chrome partitions as well as a special partition on the boot disk. The installation process may deploy (e.g., write) a Windows PE image to the special partition and create a boot entry in the boot options of the UEFI BIOS to boot using the Windows PE image on the special partition, thereby causing the computing device (e.g., SUT) to boot to Windows PE on subsequent reboots. In this way, Windows PE is used to execute previously developed diagnostic tests on the hardware components of the computing device. Thus, the manufacturer avoids having to develop new diagnostic tests when installing Chrome OS on the same hardware on which Windows OS may be installed.

FIG. 6 is a flowchart of a process 600 that includes deleting a special partition, according to some embodiments. Part of the process 600 may be performed by CPU 126 of FIGS. 1, 2, and 3 and a remainder may be performed by the Chrome setup 314 of FIG. 3.

At 602, the process may flash Coreboot firmware into a reserved portion (e.g., block) of a ROM used to store the BIOS. At 604, the process may perform a cleanup of content generated during the installation process (e.g., content that is not relevant to the end user). At 606, the process may delete a PEboot entry (e.g., an entry in the boot options of the UEFI BIOS that caused the computing device to boot from the Windows PE image located in the special partition of the Chrome OS image on the boot disk). For example, in FIG. 3, if the factory order specifies that the computing device 102 is to be built with Chrome OS, the installation script 144 may flash (e.g., write) Coreboot firmware 302 into the ROM 124. For example, the flash may cause the Coreboot firmware 302 to be placed into a reserved portion of the ROM 124, such that the Coreboot firmware 302 is not executed until the computing device 102 reboots. After flashing the Coreboot firmware 302 to the ROM 124, the installation script 144 may send a delete WinPE instruction 304 to cause removal (e.g., deletion) of the WinPE content (e.g., the Windows PE image 120) from the special partition 142 of FIG. 2. The installation script 144 may send a delete PEboot instruction 306 to cause removal (e.g., deletion) of the PEboot 214 entry in the UEFI BIOS 146 of FIG. 2. The delete PEboot instruction 306 may perform a cleanup by deleting unneeded files and/or folders that were created during the installation process.

At 608, the process may initiate a special reset of the computing device. At 610, the computing device may boot to Chrome OS with the Coreboot firmware and initiate a Chrome OS setup process. For example, in FIG. 3, the installation script 144 may send a special reset 308 that causes a reset to the EC 310, a chipset reset (e.g., resetting the Intel® management engine (ME) 312), and a reset of the CPU 126. The special reset 308 may cause the computing device 102 to reboot. During the reboot, the Coreboot firmware 302 may be applied, e.g., causing the Coreboot firmware 302 to be installed into an executable area of the ROM 124, e.g., the ROM 124 (that is used to store the BIOS) is flashed from UEFI firmware 146 of FIG. 2 to the Coreboot firmware 302 using a tool which runs under the UEFI firmware 146. After the Coreboot firmware 302 is applied to the ROM 124, the computing device 102 may boot to the Chrome OS environment, e.g., using the Chrome OS image 138 that is installed on the boot disk 134. Because the computing device 102 is booting to the Chrome OS environment for the first time, the computing device 102 may run a Chrome setup 314 (e.g., a setup script).

At 612, the Chrome OS setup may determine whether the boot disk includes a special partition. If a determination is made, at 612, that the boot disk does not include a special partition, then the process proceeds to 616. If a determination is made, at 612, that the boot disk includes the special partition, then the process deletes the special partition, at 614, and proceeds to 616. At 616, the Chrome OS setup may merge free disk space of the boot disk with a customer partition. At 618, one or more Google Required Tests (GRT) may be performed. At 620, the Chrome OS may be installed (e.g., using the Chrome OS image that has been written to the boot disk). For example, in FIG. 3, the Chrome setup 314 may run one or more Google Required Tests (GRT) 316 and install Chrome OS on the boot disk 134. The Chrome setup 314 may check for the existence of the special partition 142 of FIG. 2. If the Chrome setup 314 determines that the special partition 142 is located on the boot disk 134, then the Chrome setup 314 may delete (e.g., remove) the special partition 142 of FIG. 2 on the boot disk 134. The Chrome setup 314 may merge the free disk space (including the space that was occupied by the deleted special partition) into a Chrome customer partition (e.g., one of the partitions 140).

Thus, a special partition is created on a Chrome OS image and used to store Windows PE to enable a single manufacturing process to install either (i) a UEFI BIOS supported OS (e.g., Windows OS) or (ii) a non-UEFI BIOS OS (e.g., Chrome). The Chrome OS image with the special partition that includes Windows PE enables a manufacturer to install Windows OS or Coreboot and Chrome OS on the same hardware while using the diagnostic and configuration tests that execute under UEFI BIOS-based Windows PE. In addition, when Chrome OS is installed, the standard Google tests (e.g., GRT) are run in addition to the diagnostic tests that were run in Windows PE (WinPE). The special partition enables the installation process to transition the SUT (e.g., computing device) from the UEFI BIOS OS environment to the non 0 UEFI firmware OS environment. The SUT is automatically (e.g., without human interaction) flashed, in real-time, from a UEFI BIOS to a non-UEFI firmware (e.g., Coreboot) during the installation process. In this way, a manufacturer that desires to offer a UEFI BIOS and supported OS (e.g., Windows) and a non-UEFI BIOS (e.g., Coreboot) and OS (e.g., Chrome) is able to use a single installation process for a single hardware platform rather than having to use two separate and distinct installation processes (e.g., a first process for UEFI supported operating systems and a second process for non-UEFI BIOS supported operating systems. The installation process is able to leverage (e.g., re-use) existing diagnostic tests and configuration tests used to install a UEFI BIOS supported OS even when a non-UEFI BIOS (e.g., Coreboot) and OS (e.g., Chrome) are being installed on the same hardware platform.

Figure 7:
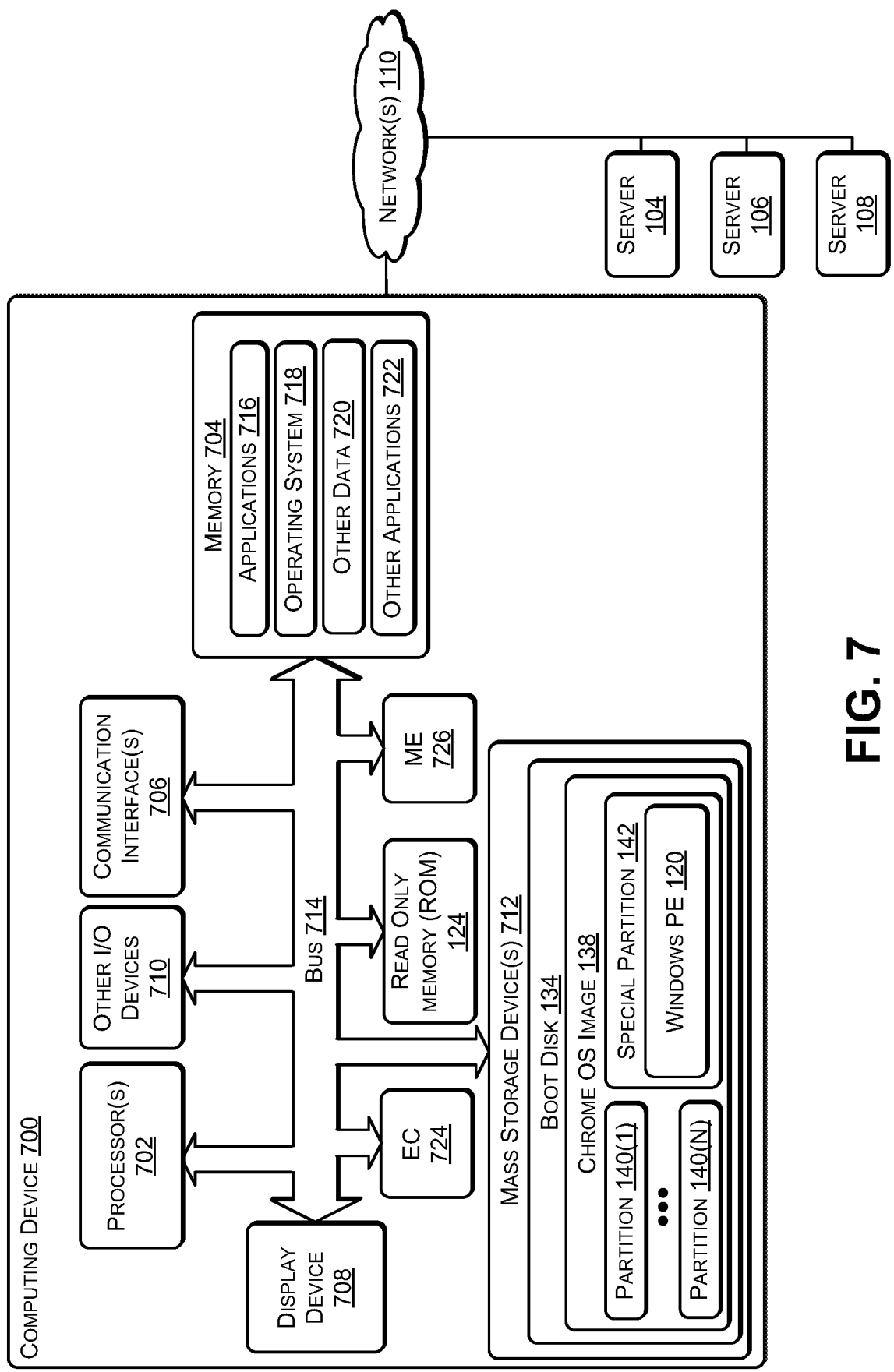
FIG. 7 illustrates an example configuration of a computing device that can be used to implement the systems and techniques described herein.

FIG. 7 illustrates an example configuration of a computing device 700 that can be used to implement the systems and techniques described herein, such as for example, the computing devices 102 of FIGS. 1, 2, and 3.

The computing device 700 may include one or more processors 702 (e.g., including the CPU 126, a graphics processing unit (GPU), or the like), a memory 704 (e.g., RAM 132), communication interfaces 706 (e.g., NIC 128), a display device 708, other input/output (I/O) devices 710 (e.g., the USB ports 130, a keyboard, a trackball, and the like), the ROM 124, and one or more mass storage devices 712 (e.g., disk drive, solid state disk drive, or the like), configured to communicate with each other, such as via one or more system buses 714 or other suitable connections. In some cases, an embedded controller (EC) 724 and a management engine (ME) 726 (e.g., Intel® ME) may be connected to the bus 714. The mass storage devices 712 may include the boot disk 134. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU 126 or the GPU may be a separate processor device from the CPU 126. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 706 for exchanging data via the network 106. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 702.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 116 and mass storage devices 712, may be used to store software and data. For example, the computer storage media may be used to store applications 176, an operating system 718 (e.g., Windows OS or Chrome OS), other data 720, and other applications 722.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

booting, by one or more processors, a computing device into a preinstallation environment of a first operating system, the preinstallation environment located on a memory drive that is connected to a port of the computing device, the computing device comprising a plurality of hardware components including a read only memory (ROM) that stores a Unified Extensible Firmware Interface (UEFI);

in response to booting the computing device:

determining, by the preinstallation environment, that a second operating system is to be installed onto the computing device;

writing, by the preinstallation environment, an image of the second operating system to a boot disk of the computing device, the image including a special partition;

writing, by the preinstallation environment, an image of the preinstallation environment of the first operating system to the special partition of the image of the second operating system;

creating, by the preinstallation environment, a boot entry in the UEFI to cause the computing device to boot to the image of the preinstallation environment of the first operating system that is located in the special partition; and rebooting, by the preinstallation environment, the computing device to the image of the preinstallation environment of the first operating system that is located in the special partition; and in response to rebooting the computing device:

executing, by the one or more processors, one or more diagnostic tests in the image of the preinstallation environment of the first operating system; and booting, by the one or more processors, the computing device to the second operating system.

2. The method of claim 1, wherein booting the computing device into the second operating system comprises:

writing Coreboot firmware into a reserved area of the ROM;

rebooting the computing device; and installing the Coreboot firmware into the ROM, overwriting the UEFI.

3. The method of claim 2, further comprising:

initiating a reset of an embedded controller of the computing device;

initiating a chipset reset of a chipset associated with the one or more processors; and initiating a processor reset of the one or more processors.

4. The method of claim 3, further comprising:

booting the computing device using the Coreboot firmware;

initiating a setup of the second operating system into the boot disk; and executing one or more tests associated with the second operating system.

5. The method of claim 3, further comprising:

deleting the special partition including the image of the preinstallation environment of the first operating system; and merging free space in the boot disk into a customer partition.

6. The method of claim 2, further comprising:

deleting the boot entry in the UEFI that causes the computing device to boot into the image of the preinstallation environment of the first operating system in the special partition.

7. The method of claim 1, wherein:

the first operating system comprises Microsoft® Windows; and the second operating system comprises Google® Chrome.

8. The method of claim 1, wherein booting the computing device into the second operating system comprises:

writing boot firmware associated with the second operating system into a reserved area of the ROM;

rebooting the computing device; and installing the boot firmware into the ROM, overwriting the UEFI.

9. A computing device comprising:

a plurality of hardware components comprising:

a read only memory (ROM) storing a Unified Extensible Firmware Interface (UEFI);

a boot disk;

one or more ports;

one or more processors; and one or more non-transitory computer readable media;

wherein the one or more non-transitory computer readable media store instructions executable by the one or more processors to perform operations comprising:

booting into a preinstallation environment of a first operating system that is located on a memory drive that is connected to a particular port of the one or more ports;

determining that a second operating system is to be installed onto the computing device;

writing an image of the second operating system to the boot disk, the image including a special partition;

writing the preinstallation environment of the first operating system to the special partition of the image of the second operating system;

creating a boot entry in the UEFI to cause the computing device to boot into the preinstallation environment of the first operating system that is located in the special partition;

booting the computing device to the preinstallation environment of the first operating system that is located in the special partition;

executing one or more diagnostic tests in the preinstallation environment of the first operating system;

booting the computing device into the second operating system, wherein booting the computing device into the second operating system includes writing Coreboot firmware into a reserved area of the ROM, rebooting the computing device, and installing the Coreboot firmware into the ROM, overwriting the UEFI; and initiating a reset of an embedded controller of the computing device, a chipset associated with the one or more processors, and a processor of the one or more processors.

10. The computing device of claim 9, further comprising:

deleting the boot entry in the UEFI that causes the computing device to boot into the preinstallation environment of the first operating system in the special partition.

11. The computing device of claim 9, wherein the operations further comprise:

booting the computing device using the Coreboot firmware;

initiating a setup of the second operating system into the boot disk; and executing one or more tests associated with the second operating system.

12. The computing device of claim 9, wherein the operations further comprise:

deleting the special partition including the preinstallation environment of the first operating system; and merging free space of the boot disk into a customer partition.

13. One or more non-transitory computer readable media storing instructions executable by one or more processors to perform operations comprising:

booting a computing device into a preinstallation environment of a first operating system, the preinstallation environment located on a memory drive that is connected to a port of the computing device, the computing device comprising a plurality of hardware components including a Unified Extensible Firmware Interface (UEFI) stored in a read only memory (ROM);

determining that a second operating system is to be installed onto the computing device;

writing an image of the second operating system to a boot disk of the computing device, the image including a special partition;

writing the preinstallation environment of the first operating system to the special partition of the image of the second operating system;

creating a boot entry in the UEFI to cause the computing device to boot to the preinstallation environment of the first operating system that is located in the special partition;

booting the computing device to the preinstallation environment of the first operating system that is located in the special partition;

executing one or more diagnostic tests in the preinstallation environment of the first operating system; and booting the computing device to the second operating system, wherein booting the computing device into the second operating system comprises:

writing boot firmware associated with the second operating system into a reserved area of the ROM;

rebooting the computing device; and installing the boot firmware into the ROM, overwriting the UEFI.

14. The one or more non-transitory computer readable media of claim 13, wherein the boot firmware includes Coreboot firmware.

15. The one or more non-transitory computer readable media of claim 14, wherein the operations further comprise:

initiating a reset of an embedded controller of the computing device;

initiating a chipset reset of a chipset associated with the one or more processors; and initiating a processor reset of the one or more processors.

16. The one or more non-transitory computer readable media of claim 15, wherein the operations further comprise:

booting the computing device using the Coreboot firmware;

initiating a setup of the second operating system into the boot disk; and executing one or more tests associated with the second operating system.

17. The one or more non-transitory computer readable media of claim 15, wherein the operations further comprise:

deleting the special partition including the preinstallation environment of the first operating system; and merging free space in the boot disk into a customer partition.

18. The one or more non-transitory computer readable media of claim 17, wherein the operations further comprise:

the first operating system comprises Microsoft® Windows; and the second operating system comprises Google® Chrome.

19. The one or more non-transitory computer readable media of claim 14, wherein the operations further comprise:

deleting the boot entry in the UEFI that causes the computing device to boot into the preinstallation environment of the first operating system in the special partition.

* * * * *